United States Patent
Hogan et al.

(10) Patent No.: US 10,465,433 B2
(45) Date of Patent: Nov. 5, 2019

(54) VACUUM INSULATING GLASS (VIG) UNIT WITH LEAD-FREE DUAL-FRIT SEALS AND/OR METHODS OF MAKING THE SAME

(71) Applicant: Guardian Glass, LLC, Auburn Hills, MI (US)

(72) Inventors: John P. Hogan, Dearborn, MI (US); Timothy Alan Dennis, Bloomdale, OH (US); Rudolph Hugo Petrmichl, Ann Arbor, MI (US); Greg Kemenah, Auburn Hills, MI (US)

(73) Assignee: GUARDIAN GLASS, LLC., Auburn Hills, MI (US)

( * ) Notice: Subject to any disclaimer, the term of this patent is extended or adjusted under 35 U.S.C. 154(b) by 0 days.

(21) Appl. No.: 15/417,273

(22) Filed: Jan. 27, 2017

(65) Prior Publication Data

US 2017/0138115 A1    May 18, 2017

Related U.S. Application Data

(62) Division of application No. 14/172,368, filed on Feb. 4, 2014, now Pat. No. 9,593,527.

(51) Int. Cl.
| | |
|---|---|
| *E06B 3/663* | (2006.01) |
| *E06B 3/66* | (2006.01) |
| *C03C 8/24* | (2006.01) |
| *E06B 3/677* | (2006.01) |
| *C03C 3/062* | (2006.01) |

(Continued)

(52) U.S. Cl.
CPC ........ *E06B 3/66357* (2013.01); *C03B 23/203* (2013.01); *C03B 27/012* (2013.01);
(Continued)

(58) Field of Classification Search
CPC ...... E06B 3/66; E06B 3/6612; E06B 3/66342; E06B 3/66357; Y02B 80/24; C03C 27/06
See application file for complete search history.

(56) References Cited

U.S. PATENT DOCUMENTS

| | | | |
|---|---|---|---|
| 2,727,301 A | 12/1955 | Magnus et al. | |
| 2,936,923 A | 5/1960 | Veres | |

(Continued)

FOREIGN PATENT DOCUMENTS

| | | |
|---|---|---|
| AU | 60 657 | 1/1967 |
| DE | 195 45 422 | 6/1997 |

(Continued)

OTHER PUBLICATIONS

Machine translation of cited reference JP 2002-241143 (Year: 2002).*

(Continued)

*Primary Examiner* — Donald J Loney

(57) ABSTRACT

Certain example embodiments of this invention relate to vacuum insulating glass (VIG) units having improved seals made using two different frit-based edge seal materials, and/or methods of making the same. In certain example embodiments, a first frit material is applied around peripheral edges of first and second glass substrates. The first frit material, which may be bismuth-based in certain example embodiments, is fired with a heat treatment (e.g., thermal tempering) process. A second frit material, which may be VBZ-based in certain example embodiments, is applied and at least partially overlaps with the fired first frit material. The first frit material acts as a primer, and the second frit material helps seal together the VIG unit. The second frit material is fired at a significantly lower temperature that enables the glass to retain the temper or other strength imparted by the heat treatment.

6 Claims, 4 Drawing Sheets

US 10,465,433 B2

Page 2

(51) Int. Cl.
| | |
|---|---|
| *C03C 3/066* | (2006.01) |
| *C03C 3/12* | (2006.01) |
| *C03C 3/14* | (2006.01) |
| *C03C 3/145* | (2006.01) |
| *C03C 8/02* | (2006.01) |
| *C03C 8/04* | (2006.01) |
| *C03C 8/14* | (2006.01) |
| *C03C 8/22* | (2006.01) |
| *C03C 27/06* | (2006.01) |
| *C03B 23/203* | (2006.01) |
| *C03B 27/012* | (2006.01) |
| *E06B 3/673* | (2006.01) |

(52) U.S. Cl.
CPC .............. *C03C 3/062* (2013.01); *C03C 3/066* (2013.01); *C03C 3/122* (2013.01); *C03C 3/14* (2013.01); *C03C 3/145* (2013.01); *C03C 8/02* (2013.01); *C03C 8/04* (2013.01); *C03C 8/14* (2013.01); *C03C 8/22* (2013.01); *C03C 8/24* (2013.01); *C03C 27/06* (2013.01); *E06B 3/6612* (2013.01); *E06B 3/6775* (2013.01); *E06B 3/67334* (2013.01); *E06B 3/6736* (2013.01); *Y02A 30/25* (2018.01); *Y02B 80/24* (2013.01)

(56) References Cited

U.S. PATENT DOCUMENTS

| | | | |
|---|---|---|---|
| 2,988,852 | A | 6/1961 | Henry |
| 3,120,433 | A | 2/1964 | Zee |
| 3,222,153 | A | 12/1965 | Brown |
| 3,252,811 | A | 5/1966 | Beall |
| 3,267,569 | A | 9/1966 | Eichorn et al. |
| 3,331,659 | A | 7/1967 | Malloy |
| 3,650,778 | A | 3/1972 | Dumesnil et al. |
| 3,837,866 | A | 9/1974 | Malmendier et al. |
| 3,862,830 | A | 1/1975 | Stern |
| 3,947,260 | A | 3/1976 | Salisbury |
| 3,981,753 | A | 9/1976 | Hopper |
| 3,995,941 | A | 12/1976 | Nagahara et al. |
| 4,045,200 | A | 8/1977 | Salisbury |
| 4,130,408 | A | 12/1978 | Crossland et al. |
| 4,186,023 | A | 1/1980 | Dumesnil et al. |
| 4,252,415 | A | 2/1981 | Klein et al. |
| 4,256,495 | A | 3/1981 | Kawamura et al. |
| 4,269,617 | A | 5/1981 | Yoshimichi et al. |
| 4,314,031 | A | 2/1982 | Sanford et al. |
| 4,450,441 | A | 5/1984 | Person et al. |
| 4,482,579 | A | 11/1984 | Fujii et al. |
| 4,683,154 | A | 7/1987 | Benson et al. |
| 4,743,302 | A | 5/1988 | Dumesnil et al. |
| 4,788,471 | A | 11/1988 | Strauss |
| 4,801,488 | A | 1/1989 | Smith |
| 4,810,484 | A | 3/1989 | Uedaira et al. |
| 4,820,365 | A | 4/1989 | Brumm et al. |
| 5,013,360 | A | 5/1991 | Finkelstein et al. |
| 5,051,381 | A | 9/1991 | Ohji et al. |
| 5,089,446 | A | 2/1992 | Cornelius et al. |
| 5,188,990 | A | 2/1993 | Dumesnil et al. |
| 5,336,644 | A | 8/1994 | Akhtar et al. |
| 5,355,051 | A | 10/1994 | Fondrk |
| 5,516,733 | A | 5/1996 | Morena |
| 5,534,469 | A | 7/1996 | Hayashi |
| 5,589,731 | A | 12/1996 | Fahlen et al. |
| 5,643,644 | A | 7/1997 | Demars |
| 5,643,840 | A | 7/1997 | Hikata et al. |
| 5,657,607 | A | 8/1997 | Collins et al. |
| 5,664,395 | A | 9/1997 | Collins et al. |
| 5,766,053 | A | 6/1998 | Cathey et al. |
| 5,891,536 | A | 4/1999 | Collins et al. |
| 5,902,652 | A | 5/1999 | Collins et al. |
| 6,187,700 | B1 | 2/2001 | Merkel |
| 6,300,263 | B1 | 10/2001 | Merkel |
| 6,326,685 | B1 | 12/2001 | Jin et al. |
| 6,336,984 | B1 | 1/2002 | Aggas |
| 6,365,242 | B1 | 4/2002 | Veerasamy |
| 6,383,580 | B1 | 5/2002 | Aggas |
| 6,391,809 | B1 | 5/2002 | Young |
| 6,399,169 | B1 | 6/2002 | Wang et al. |
| 6,444,281 | B1 | 9/2002 | Wang et al. |
| 6,503,583 | B2 | 1/2003 | Nalepka et al. |
| 6,506,472 | B1 | 1/2003 | Tanaka et al. |
| 6,541,083 | B1 | 4/2003 | Landa et al. |
| 6,566,290 | B2 | 5/2003 | Beall et al. |
| 6,635,321 | B2 | 10/2003 | Wang et al. |
| 6,641,689 | B1 | 11/2003 | Aggas |
| 6,692,600 | B2 | 2/2004 | Veerasamy et al. |
| 6,701,749 | B2 | 3/2004 | Wang et al. |
| 6,946,171 | B1 | 9/2005 | Aggas |
| 6,998,776 | B2 | 2/2006 | Aitken et al. |
| 7,105,235 | B2 | 9/2006 | Lo et al. |
| 7,244,480 | B2 | 7/2007 | Minaai et al. |
| 7,425,518 | B2 | 9/2008 | Yoshida et al. |
| 7,435,695 | B2 | 10/2008 | Hormadaly |
| 7,452,489 | B2 | 11/2008 | Sawai et al. |
| 7,602,121 | B2 | 10/2009 | Aitken et al. |
| 8,227,055 | B2 | 7/2012 | Wang |
| 8,500,933 | B2 | 8/2013 | Cooper |
| 8,506,738 | B2 | 8/2013 | Wang et al. |
| 8,857,698 | B2 | 10/2014 | Bouesnard et al. |
| 9,458,052 | B2 | 10/2016 | Dennis |
| 9,593,527 | B2 | 3/2017 | Hogan et al. |
| 2002/0035852 | A1* | 3/2002 | Wang ................... C03B 27/00 65/34 |
| 2004/0043887 | A1 | 3/2004 | Paulson |
| 2004/0207314 | A1 | 10/2004 | Aitken et al. |
| 2005/0001545 | A1 | 1/2005 | Aitken et al. |
| 2005/0110168 | A1 | 5/2005 | Chuang |
| 2005/0191515 | A1 | 9/2005 | Brese et al. |
| 2005/0233885 | A1 | 10/2005 | Yoshida et al. |
| 2006/0003883 | A1 | 1/2006 | Yoshida et al. |
| 2006/0042748 | A1 | 3/2006 | Hasegawa et al. |
| 2006/0128549 | A1 | 6/2006 | Hormadaly |
| 2007/0191203 | A1 | 8/2007 | Yoshida et al. |
| 2008/0300126 | A1 | 12/2008 | Goedeke et al. |
| 2009/0064717 | A1 | 3/2009 | Son et al. |
| 2009/0151854 | A1 | 6/2009 | Cooper |
| 2009/0151855 | A1 | 6/2009 | Wang et al. |
| 2009/0297862 | A1 | 12/2009 | Boek et al. |
| 2010/0180934 | A1 | 7/2010 | Naito et al. |
| 2010/0275654 | A1 | 11/2010 | Wang |
| 2010/0330308 | A1 | 12/2010 | Cooper et al. |
| 2011/0130264 | A1 | 6/2011 | Beall |
| 2012/0128904 | A1 | 5/2012 | Masuda et al. |
| 2012/0211146 | A1 | 8/2012 | Dennis |
| 2012/0213951 | A1 | 8/2012 | Dennis |
| 2012/0213952 | A1 | 8/2012 | Dennis |
| 2012/0213953 | A1 | 8/2012 | Dennis |
| 2012/0304696 | A1 | 12/2012 | Miller et al. |
| 2013/0074445 | A1 | 3/2013 | Jones |
| 2013/0153550 | A1 | 6/2013 | Dear |
| 2013/0153551 | A1 | 6/2013 | Dear |
| 2013/0292000 | A1 | 11/2013 | Dennis et al. |
| 2013/0302542 | A1 | 11/2013 | Jones |
| 2013/0305785 | A1 | 11/2013 | Dennis |
| 2013/0306222 | A1 | 11/2013 | Dennis |
| 2013/0309425 | A1 | 11/2013 | Dennis |
| 2013/0323441 | A1 | 12/2013 | Dennis et al. |

FOREIGN PATENT DOCUMENTS

| | | |
|---|---|---|
| EP | 0 013 650 | 7/1980 |
| EP | 0 061 183 | 9/1982 |
| EP | 0 889 010 | 1/1999 |
| EP | 1 065 183 | 1/2001 |
| EP | 1 281 329 | 3/2003 |
| EP | 1 571 134 | 9/2005 |
| EP | 2 017 236 | 1/2009 |
| JP | 2002-137939 | 5/2002 |
| JP | 2002-241143 * | 8/2002 |
| JP | 2003-510238 | 3/2003 |
| JP | 2003-137613 | 5/2003 |

(56) References Cited

FOREIGN PATENT DOCUMENTS

| JP | 2004-250276 | 9/2004 |
|---|---|---|
| JP | 2005-112715 | 4/2005 |
| JP | 2006-137635 A | 6/2006 |
| JP | 2009-298673 | 12/2009 |
| KR | 10-2010-0004572 | 1/2012 |
| RU | 1791433 | 1/1993 |
| SU | 852811 | 8/1981 |
| SU | 1 578 093 | 7/1990 |
| SU | 1590472 | 9/1990 |
| SU | 1694561 | 11/1991 |
| WO | WO 96/02473 | 2/1996 |
| WO | WO 96/22255 | 7/1996 |
| WO | WO 99/11580 | 3/1999 |
| WO | WO 01/23700 | 4/2001 |
| WO | WO 02/14640 | 2/2002 |
| WO | WO 02/27135 | 4/2002 |
| WO | WO 2006/044383 | 4/2006 |
| WO | WO 2012/035565 | 3/2012 |
| WO | WO 2012/115796 | 8/2012 |
| WO | WO 2012/115808 | 8/2012 |

OTHER PUBLICATIONS

U.S. Appl. No. 14/172,368, filed Feb. 4, 2014; Hogan et al.
U.S. Appl. No. 13/480,987, filed May 25, 2012; Dennis.
U.S. Appl. No. 14/172,432, filed Feb. 4, 2014; Hogan et al.
Empower Materials: Binders for Glass Powders & Substrates (1 pg).
U.S. Appl. No. 13/238,358, filed Sep. 21, 2011; Dennis.
U.S. Appl. No. 12/929,874, filed Feb. 22, 2011; Dennis.
U.S. Appl. No. 12/929,876, filed Feb. 22, 2011; Cooper, et al.
U.S. Appl. No. 12/929,875, filed Feb. 22, 2011; Dennis.
"Pb-Free Vanadium-Based Low-Melting Glass Paste: VS-1026"; Hitachi Powered Metals Technical Report No. 7, (2008) (1 page).
Collins, "Design of Support Pillar Arrays in Flat Evacuated Windows," Aust. J. Phys., 1991, 44, pp. 545-563 (20 pages).
U.S. Appl. No. 13/628,653, filed Sep. 27, 2012.
U.S. Appl. No. 13/562,386, filed Jul. 31, 2012; Petrmichl, et al.
U.S. Appl. No. 13/562,408, filed Jul. 31, 2012; Hogan, et al.
U.S. Appl. No. 13/562,423, filed Jul. 31, 2012; Petrmichl, et al.
Simko, et al., "Temperature-Induced Stresses in Vacuum Glazing Modelling and Experimental Validation," Solar Energy, vol. 63, No. 1, 1998 (21 pages).
Lenzen, et al., "Thermal Outgassing of Vacuum Glazing," School of Physics, The University of Syndey, 1999 (31 pages).
U.S. Appl. No. 12/000,663, filed Dec. 14, 2007; Cooper.
U.S. Appl. No. 12/000,791, filed Dec. 17, 2007; Wang et al.
U.S. Appl. No. 12/453,221, filed May 1, 2009; Wang.
U.S. Appl. No. 12/458,071, filed Jun. 30, 2009; Cooper et al.

\* cited by examiner

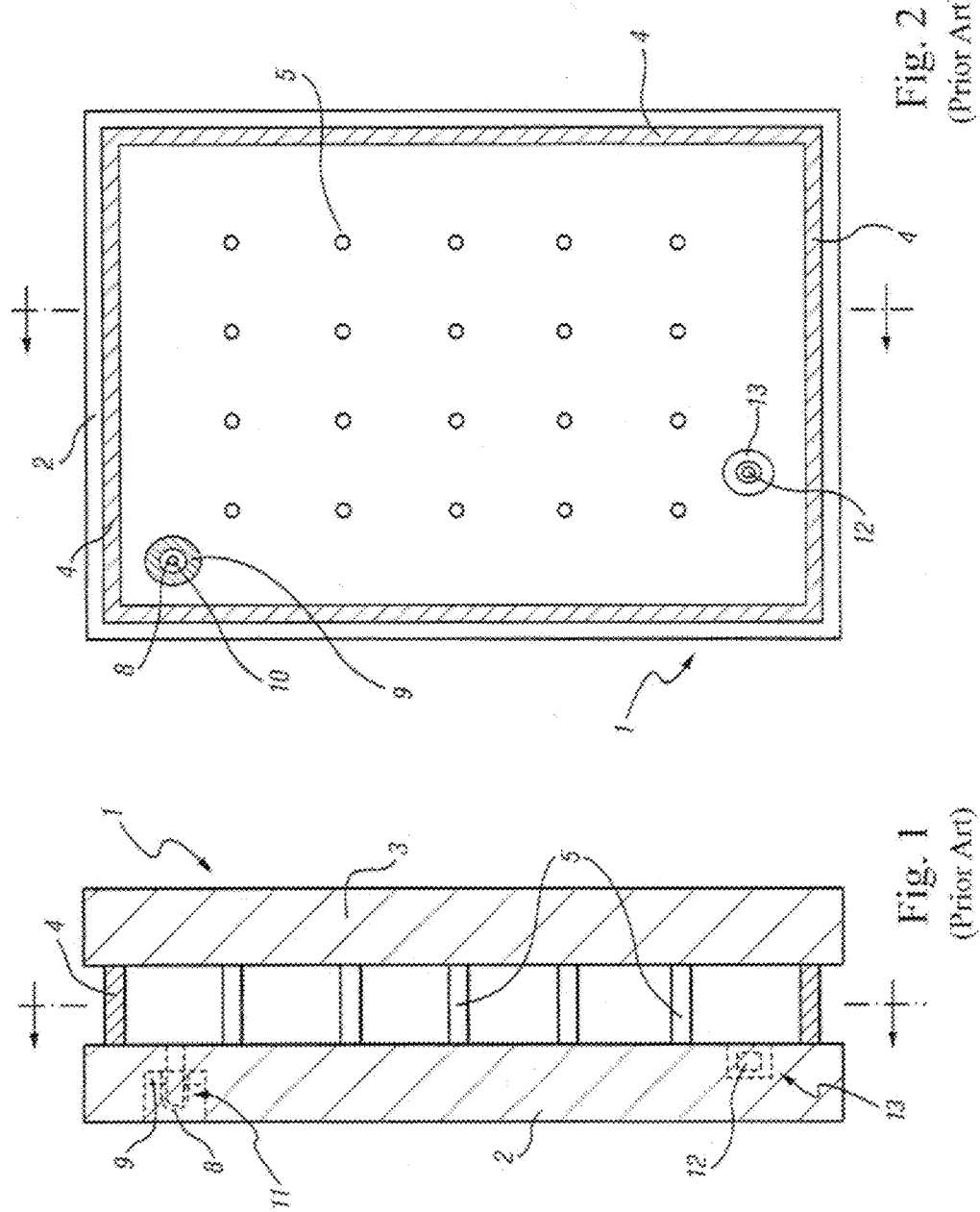

VACUUM INSULATING GLASS (VIG) UNIT WITH LEAD-FREE DUAL-FRIT SEALS AND/OR METHODS OF MAKING THE SAME

This application is a divisional of application Ser. No. 14/172,368, filed Feb. 4, 2014, which incorporates by reference the entire contents of application Ser. No. 13/480,987, filed May 25, 2012 (now U.S. Pat. No. 9,458,052), the entire disclosures of which are both hereby incorporated herein by reference in this application.

FIELD OF THE INVENTION

Certain example embodiments of this invention relate to vacuum insulating glass (VIG or vacuum IG) units, and/or methods of making the same. More particularly, certain example embodiments of this invention relate to VIG units having improved seals made using two different frit-based edge seal materials, and/or methods of making the same.

BACKGROUND AND SUMMARY OF EXAMPLE EMBODIMENTS OF THE INVENTION

Vacuum insulating glass (VIG or vacuum IG) units are known in the art. Some example VIG configurations are disclosed, for example, in U.S. Pat. Nos. 5,657,607, 5,664,395, 5,657,607, 5,902,652, 6,506,472 and 6,383,580, the disclosures of which are all hereby incorporated by reference herein in their entireties.

FIGS. 1 and 2 illustrate a typical VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 that may be made of fused solder glass or the like, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 or the like to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure that is less than atmospheric pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed.

VIG units with peripheral hermetic edge seals 4 (e.g., solder glass) are typically manufactured by depositing glass frit or other suitable material in a solution (e.g., frit paste) around the periphery of substrate 2 (or on substrate 3). This glass frit paste ultimately forms the edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then typically heated to a temperature of at least about 440° C., at which point the glass frit melts, wets the surfaces of the glass substrates 2, 3, and ultimately forms a hermetic peripheral/edge seal 4.

The composition of conventional edge seals are known in the art. See, for example, U.S. Pat. Nos. 3,837,866; 4,256,495; 4,743,302; 5,051,381; 5,188,990; 5,336,644; 5,534,469; 7,425,518, and U.S. Publication No. 2005/0233885, the disclosures of which are all hereby incorporated herein by reference.

After formation of the edge seal 4 between the substrates, a vacuum is drawn via the pump-out tube 8 to form low pressure space/cavity 6 between the substrates 2, 3. The pressure in space/cavity 6 may be produced by way of an evacuation process to a level below atmospheric pressure, e.g., below about $10^{-2}$ Torr. To maintain the low pressure in the space/cavity 6, substrates 2, 3 are hermetically sealed via the edge seal and sealing off of the pump-out tube. Small high strength spacers/pillars 5 are provided between the transparent glass substrates to maintain separation of the approximately parallel glass substrates against atmospheric pressure. As noted above, once the space 6 between substrates 2, 3 is evacuated, the pump-out tube 8 may be sealed, for example, by melting its tip using a laser or the like.

High-temperature bonding techniques such as, for example, glass frit bonding, as discussed above, have been widely used method for hermetically sealing (e.g., forming an edge seal) components made of silicon, ceramics, glass, or the like. The heat required for these high-temperature processes is typically in the range of about 440-600 degrees C., and oftentimes even higher. These conventional bonding techniques typically require oven-intensive bulk heating in which the entire device (including the glass and any components housed within the glass housing) comes to near thermal equilibrium with the oven for a seal to form. As a result, a relatively long period of time is required to achieve an acceptable seal. It is also the case that the most temperature sensitive component determines the maximum allowable temperature of the entire system.

Thus, high-temperature sealing processes discussed above (e.g., for glass frit bonding) unfortunately are not suitable for fabricating heat-sensitive components such as, for example, tempered VIG units. In the case of tempered VIG units, the thermally tempered glass substrates of a VIG unit would rapidly lose temper strength in the high-temperature environment. For instance, the aforesaid high temperatures and long heating times of the entire assembly utilized in the formulation of edge seal 4 are undesirable, especially when it is desired to use a heat strengthened or tempered glass substrate(s) 2, 3 in the vacuum IG unit. Moreover, such high processing temperatures may adversely affect certain low-E coating(s) that may be applied to one or both of the glass substrates in certain instances.

Tempered glass is advantageous because, when designed properly, it breaks in a fine pattern that reduces the risk of injury to persons exposed to fragments. Accordingly, measurements of fragmentation density are typically used to determine if tempered glass meets safety requirements. For example, the European standard EN 14179-1:2005 requires 4 mm tempered safety glass to break such that there are at least 40 fragments within a 50 mm×50 mm area. See FIG. 3 in this regard, which shows an example break pattern.

The correlation between heating conditions and tempering loss was established by the assignee by thermally tempering numerous 350 mm×500 mm substrates (4 mm float glass) under constant furnace conditions so as to exceed the EN 14179-1:2005 fragmentation requirement. The break pattern was measured on several substrates without further heating to ascertain the initial fragmentation density. The remaining substrates were heated at various temperatures and durations (in stacked pairs to simulate VIGs) before they were broken. The ratio of final to initial fragmentation density was taken to represent the temper loss induced by a given heating process. The results, shown in FIG. 4, demonstrate that loss of temper under the range of conditions tested is primarily driven by temperature and to a lesser degree by time. Additional experiments showed that VIGs can be made from tempered glass with sufficient residual compressive stress to tolerate 30% loss of temper and still meet the EN 14179-1:2005 fragmentation requirements. Higher levels of temper generally result in flatness issues that make it difficult to produce a continuous edge seal. As shown in FIG. 4, even very short heat exposures (<5 minutes) are limited to a maximum temperature of about 375° C. to meet this requirement. As mentioned above, glass frit bonding is typically performed in a slow process that therefore would require much lower peak temperature to meet the safety glass requirement.

One conventional solution to sealing glass substrates together is to use an epoxy. However, in the case of VIG units, epoxy compositions may be insufficient to hold a seal on a vacuum. Furthermore, epoxies may be susceptible to environmental factors that may further reduce their effectiveness when applied to VIG units.

Historically, lead-based frit has been widely used to produce hermetic seals in a variety of products, including VIGs; however, products that contain lead are being phased out due to the health consequences to the population. Accordingly, certain countries (e.g., the U.S. and at least certain countries in the European Union) may impose strict requirements on the amount of lead that can be contained in a given product. Indeed, some countries (or customers) may currently require products that are completely lead-free, while others are moving in this direction.

Thus, it will be appreciated there is a need in the art for a seal processing technique that does not involve heating the entire article to be sealed to high temperature(s), and/or articles made in such example manners.

In certain example embodiments of this invention, there is provided a method of making a vacuum insulating glass (VIG) window unit comprising first and second glass substrates, with each said substrate having first and second major surfaces. The method comprises applying a first frit material around perimeter edges of the first major surfaces of the first and second substrates; heat treating the first and second substrates with the first frit material thereon, with the first and second substrates reaching a first peak temperature; following said heat treatment, applying a second frit material on the first and/or second substrate(s) such that, for each substrate on which the second frit material is applied, the second frit material at least partially overlaps the first frit material on the respective substrate around peripheral edges thereof, the first and second frit materials having different compositions; positioning a plurality of spacers on the first surface of the first substrate; bringing together the first and second substrates such that the first major surfaces of the first and second substrates face one another, and such that a cavity is defined therebetween, in making a VIG unit subassembly; heating the subassembly in order to melt the second frit material and wet the first frit material, the heating being performed such that the first and second substrates reach a second peak temperature that is no higher than 400 degrees C. and that is at least 150 degrees C. lower than the first peak temperature; following said heating of the subassembly, cooling and/or allowing the subassembly to cool, in forming an edge seal between the first and second substrates; evacuating the cavity to a pressure less than atmospheric via a pump-out port; and sealing the pump-out port in making the VIG unit.

In certain example embodiments of this invention, there is provided a method of making a vacuum insulating glass (VIG) window unit. The method comprises having first and second articles, each said article being a glass substrate having first and second major surfaces and having a first frit material fused thereon around peripheral edges of the first major surface as a result of having been heat treated with the respective substrate; applying a second frit material on the first and/or second substrate(s) such that, for each substrate on which the second frit material is applied, the second frit material at least partially overlaps the first frit material on the respective substrate around peripheral edges thereof, the first and second frit materials having different compositions; positioning a plurality of spacers on the first surface of the first substrate; bringing together the first and second substrates such that the first major surfaces of the first and second substrates face one another, and such that a cavity is defined therebetween, in making a VIG unit subassembly; heating the subassembly in order to melt the second frit material and wet the first frit material, the heating being performed such that the first and second substrates reach a second peak temperature that is no higher than 400 degrees C. and that is at least 150 degrees C. lower than the first peak temperature; following said heating of the subassembly, cooling and/or allowing the subassembly to cool, in forming an edge seal between the first and second substrates; evacuating the cavity to a pressure less than atmospheric via a pump-out port; and sealing the pump-out port in making the VIG unit.

In certain example embodiments of this invention, a VIG window unit is provided, and it comprises first and second substantially parallel, spaced apart glass substrates. At least one of the first and second substrates is heat treated. Spacers are disposed between the first and second substrates. An edge seal is provided around the periphery of the first and/or second substrates, and the first and second substrates, together with the edge seal, define a cavity therebetween. The cavity is evacuated to a pressure less than atmospheric. The edge seal is an hermetic seal formed by heating via a low temperature process for a short duration a second frit material that is sandwiched between bands of first frit materials fused with the first and second substrates during a high temperature process, the low temperature process being performed in connection with a second peak temperature of no more than 400 degrees C. and a time of no more than 15 minutes at the second peak temperature, and the high temperature being performed at a first peak temperature that is at least 150 degrees C. higher than the second peak temperature.

In certain example embodiments of this invention, a kit comprising first and second frit materials for use in forming an edge seal for a VIG window unit is provided. The first frit material comprises at least 65% bismuth oxide, by weight, with the first frit material being fusable to glass when the glass reaches a first temperature of 550 degrees C. or higher. The second frit material comprises vanadium oxide, barium oxide, and zinc oxide, in amounts that total at least 65% by weight, with the second frit being structured to form a bond with the first frit material in making the edge seal for the VIG window unit. The second frit material is meltable when the glass reaches at a second temperature of no more than 400 degrees C., and the first frit material is wettable at the second temperature.

In certain example embodiments of this invention, a frit material for use in forming an edge seal for a VIG window unit is provided. The frit material comprises at least 65% bismuth oxide and at least 2% zinc oxide, by weight, and the frit is being designed to fuse to glass when the glass reaches a first temperature of 550 degrees C. or higher, and further is designed to wet when the glass reaches a second temperature that is at least 150 degrees C. lower than the first temperature.

In certain example embodiments of this invention, a frit material for use in forming an edge seal for a VIG window unit is provided. The frit material comprises 45-67 wt. % vanadium oxide, 7-25 wt. % barium oxide, and 4-17 wt. % zinc oxide and is designed to be meltable when a peak temperature of no greater than 360 degrees C. is maintained for a time of no more than 15 minutes (and also is potentially bondable to the frit material in the preceding paragraph under these and/or similar conditions).

In certain example embodiments of this invention, there is provided a method of making a VIG window unit comprising first and second glass substrates, with each said substrate having first and second major surfaces. A first frit material is applied around perimeter edges of the first major surfaces of the first and second substrates. The first and second substrates with the first frit material thereon are heated, with the first and second substrates reaching a first peak temperature. Following said heat treatment, a second frit material is applied on the first and/or second substrate(s) such that, for each substrate on which the second frit material is applied, the second frit material at least partially overlaps the first frit material on the respective substrate around peripheral edges thereof. The first and second frit materials have different compositions. Spacers are positioned on the first surface of the first substrate. The first and second substrates are brought together such that the first major surfaces of the first and second substrates face one another, and such that a cavity is defined therebetween, in making a VIG unit subassembly. The subassembly is heated in order to melt the second frit material and wet the first frit material, with this heating being performed such that the first and second substrates reach a second peak temperature that is no higher than 400 degrees C. and that is at least 150 degrees C. lower than the first peak temperature. Following said heating of the subassembly, the subassembly is cooled and/or allowed to cool, in forming an edge seal between the first and second substrates. The cavity is evacuated to a pressure less than atmospheric via a pump-out port. The pump-out port is sealed in making the VIG unit. At least one of the first and second substrates is thermally tempered. The second peak temperature is sufficiently low so that the tempered substrate(s) retain(s) at least about 70% of the original temper strength after the heating of the subassembly.

In certain example embodiments of this invention, there is provided a method of making a VIG window unit comprising first and second glass substrates, with each said substrate having first and second major surfaces. The second glass substrate has a hole facilitating evacuation. A first frit material is applied around perimeter edges of the first major surfaces of the first and second substrates, and in the tube seal area on the second major surface of the second substrate. The first and second substrates with the first frit material thereon are heated, with the first and second substrates reaching a first peak temperature. Following said heat treatment, a second frit material is applied on the first and/or second substrate(s) such that, for each substrate on which the second frit material is applied, the second frit material at least partially overlaps the first frit material on the respective substrate around peripheral edges thereof. The first and second frit materials have different compositions. The first frit material is also applied to a seal forming area on a pump-out tube, and the tube is then heated to fuse the first frit material onto the tube. Spacers are positioned on the first surface of the first substrate. The first and second substrates are brought together such that the first major surfaces of the first and second substrates face one another, and such that a cavity is defined there between, in making a VIG unit subassembly. The pump-out tube is inserted into the pump-out hole in the second substrate and second frit material is applied so as to overlap at least partially the first frit at the sealing area in the second substrate and to overlap at least partially the first frit on the pump-out tube. The subassembly is heated in order to melt the second frit material and wet the first frit material, with this heating being performed such that the first and second substrates reach a second peak temperature that is no higher than 400 degrees C. and that is at least 150 degrees C. lower than the first peak temperature. Following said heating of the subassembly, the subassembly is cooled and/or allowed to cool, in forming an edge seal between the first and second substrates. The cavity is evacuated to a pressure less than atmospheric via a pump-out tube. The pump-out tube is sealed in making the VIG unit. At least one of the first and second substrates is thermally tempered. The second peak temperature is sufficiently low so that the tempered substrate(s) retain(s) at least about 70% of the original temper strength after the heating of the subassembly.

One aspect of certain example embodiments relates to the use of a primer layer (e.g., a first frit) and a seal layer (e.g., a second frit, different from the first frit) in which the primer and seal layer have different functions and generally different compositions. This example aspect is different from approaches where a single seal material is heated twice, optionally with a second application between heating steps. It thus will be appreciated that the first and second frits discussed herein may in certain example instances be referred to as a primer frit or primer layer, and a top coat or seal layer.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a cross-sectional view of a conventional vacuum IG unit;

FIG. 2 top plan view of the bottom substrate, edge seal, and spacers of the FIG. 1 vacuum IG unit taken along the section line illustrated in FIG. 1;

DETAILED DESCRIPTION OF EXAMPLE EMBODIMENTS OF THE INVENTION

Certain example embodiments relate to vacuum insulating glass (VIG) units provided with durable edge seals, and/or methods of making the same. More particularly, certain example embodiments may be made by applying a first "primer" fit onto the surfaces of the two substrates (e.g., glass substrates) that will face each other when the VIG unit is assembled. The primer frit may be applied in at the peripheral edges of the substrates, e.g., in generally circumferential strips, prior to heat treatment (e.g., heat strengthening and/or thermal tempering). After heat treatment, but before a seal firing operation, a different, second "sealing" frit is applied over one or both of the now-fired primer strips. The first frit is selected to produce a mechanically strong and durable bond to float glass or the like following heat treatment (such as, for example, after typical tempering conditions where the temperature of the glass may reach or exceed temperatures of about 600 degrees C.). The second frit is selected to melt and the first frit is wetted at a sufficiently low temperature to preserve the effects of the heat treatment relative to the glass (e.g., to preserve the temper of the glass). In certain example embodiments, the second frit melts and the first frit is wetted when the glass reaches a temperature that preferably is less than 450 degrees C., more preferably less than 400 degrees C., and still more preferably less than or equal to about 360 degrees C. In some cases, the second frit melts and the first frit is wetted when the glass reaches a temperature of 300-360 degrees C.

In certain example embodiments, the primer frit comprises in major part bismuth oxide, and the sealing frit comprises in major part vanadium oxide, barium oxide, and zinc oxide. In certain example embodiments, the first primer frit thus may be said to be Bi-based solder glass, and the second sealing frit may be said to be a VBZ sealing frit. The techniques of certain example embodiments advantageously enable the production of a tempered VIG unit that can be produced with a hermetic seal that is stronger than the cohesive strength of float glass.

Figure 3:
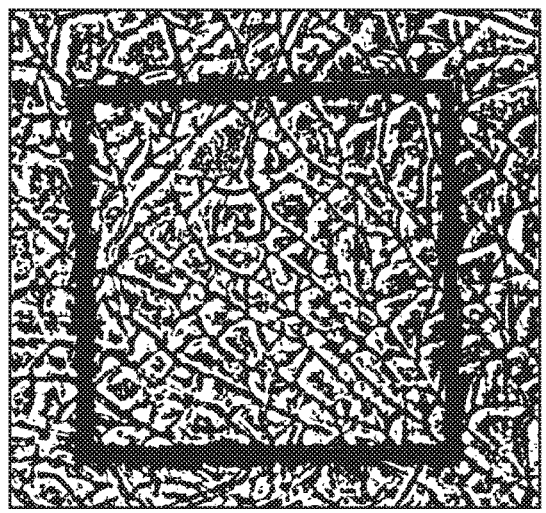
FIG. 3 is an image showing an example break pattern.
Figure 4:
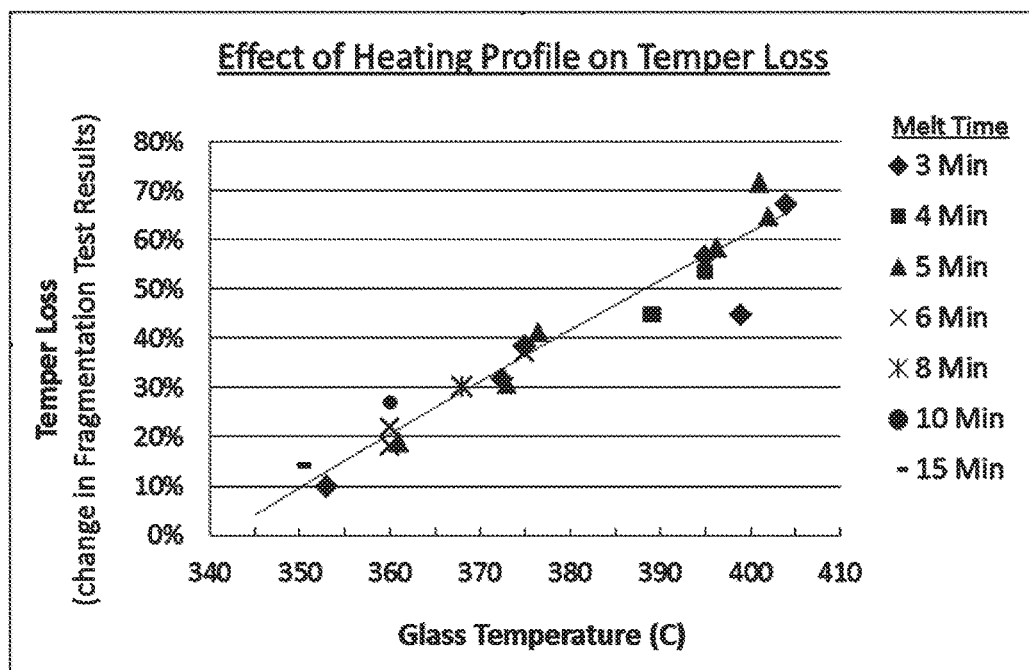
FIG. 4 is a graph showing the effect that heating profiles can have on temper loss.
Figure 5:
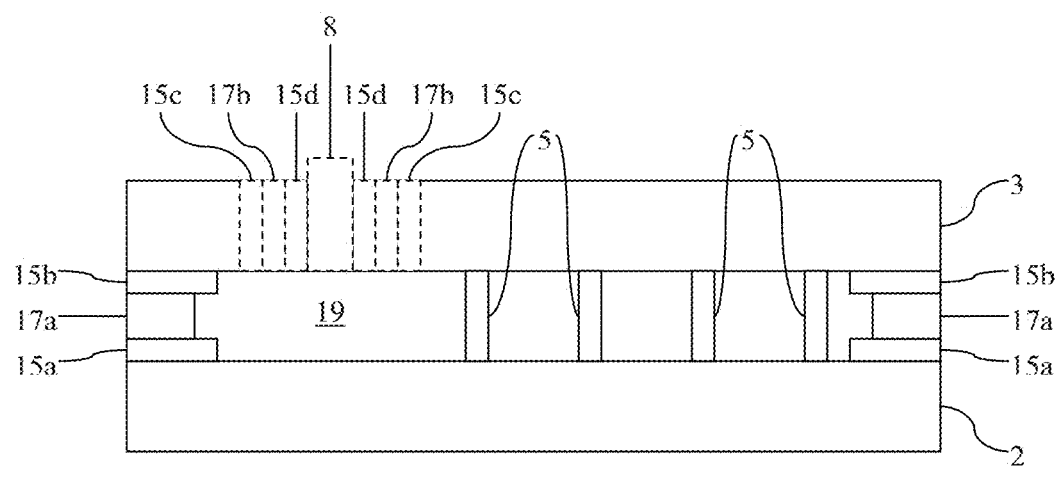
FIG. 5 is a cross-sectional view of a vacuum insulating glass (VIG) unit made in accordance with certain example embodiments.

Referring now more particularly to the drawings, FIG. 5 is a cross-sectional view of a VIG unit made in accordance with certain example embodiments. The VIG unit shown in FIG. 5 is similar to that shown and discussed above in connection with FIGS. 1-2. For instance, like the VIG unit shown and discussed above in connection with FIGS. 1-2, the VIG unit of FIG. 5 includes first and second substrates 2 and 3 in substantially parallel spaced apart orientation. A plurality of spacers 5 help maintain this relationship, even with the gap between the first and second substrates 2 and 3 being evacuated to a pressure less than atmospheric.

The VIG unit of FIG. 5 has an edge seal made from two frit materials. That is, a first frit material 15a, 15b, is applied to inner surfaces around the peripheral edges of the first and second substrates 2 and 3. This first frit material 15a, 15b serves as a primer for the second frit material 17a and is capable of surviving heat treatment (e.g., heat strengthening and/or thermal tempering). In other words, the first frit material 15a, 15b fuses to the substrates well, and enables the second frit material 17a to fuse to it instead of the glass. This enables different frit compositions to be used, with each frit composition having a different melting temperature, e.g., it may be more difficult to fuse a frit to glass as opposed to fusing a frit to another frit.

Although FIG. 5 is a cross sectional image, it will be appreciated that the first frit material 15a, 15b and the second frit material 17a may be applied in a basically circumferential strip around the substrate(s), at their edges on inner surfaces thereof. That is, the first frit material 15a, 15b may be applied to the first and second substrates 2 and 3, prior to heat treatment, via screen printing, ink jet printing, and/or any other suitable technique, in a basically circumferential strip at their edges on inner surfaces thereof. Once the first frit material 15a, 15b is fired and fused to the first and second substrates 2 and 3 via the heat treatment process, the second frit material 17a may be disposed in an at least partially overlapping manner on one or both of the substrates, over and contacting the now-fired first frit material 15a, 15b, e.g., such that it also is provided in a basically circumferential strip at the edge(s) on inner surface(s) thereof.

The dual-frit approach for the edge seal may also be used in connection with the pump-out tube 8. For instance, as indicated above, a hole may be drilled in one of the substrates to accommodate the pump-out tube 8. In the FIG. 5 example, the pump-out tube 8 is shown in the second substrate 3, although other example embodiments may locate the tube in the first substrate 2, in the edge seal, or elsewhere. In any event, the inner surface of the hole has the first primer frit material 15c applied thereto, and similarly, the pump-out tube 8 itself may have the first primer frit material 15d applied thereto, as well. The tube 8 may be bonded to the inner surfaces of the hole, e.g., by fusing second frit material 17b to the first primer frit material 15c applied to the inner surface of the hole in the second substrate 3, and to the outer surface of the tube 8 itself.

Once the tube 8 is fused to the second substrate 3, the cavity 19 may be at least partially evacuated. The tube 8 may be "tipped off" (e.g., using a laser or the like) to seal it, thereby maintaining the at least partial vacuum in the cavity 19.

Although the first and second frit materials are shown as a "sandwich" (e.g., a layer stack with 15a/17a/15b at the perimeter of the VIG unit), it will be appreciated that there may be intermixing between the layers and the surface of the substrate in some cases. For instance, in some cases, the quality of the hermetic seal may be better with increased intermixing of the frit materials 15a/17a/15b, apart from the area bonding the first frit material 15a and 15b to the substrates 2, 3. Similar comments also apply with respect to the frit provided around the pump-out tube 8.

It has been observed by the inventors that an unexpectedly strong and durable seal can be produced in a VIG, at a sealing temperature low enough to preserve the temper in the glass, by using Bi-based solder glass as a first primer frit and a VBZ-based frit as the second sealing frit, at least in certain example embodiments. By contrast, it has been observed by the inventors that using a Bi-based frit as both the first and second frit requires heating the VIG glass to more than 360 degrees C. to produce a hermetic seal (resulting in unacceptable loss of temper), whereas using a VBZ-based frit as both the first and second frit can oftentimes result in delayed seal failure potentially attributable to poor or unstable bonding to the VIG glass substrates.

Figure 6:
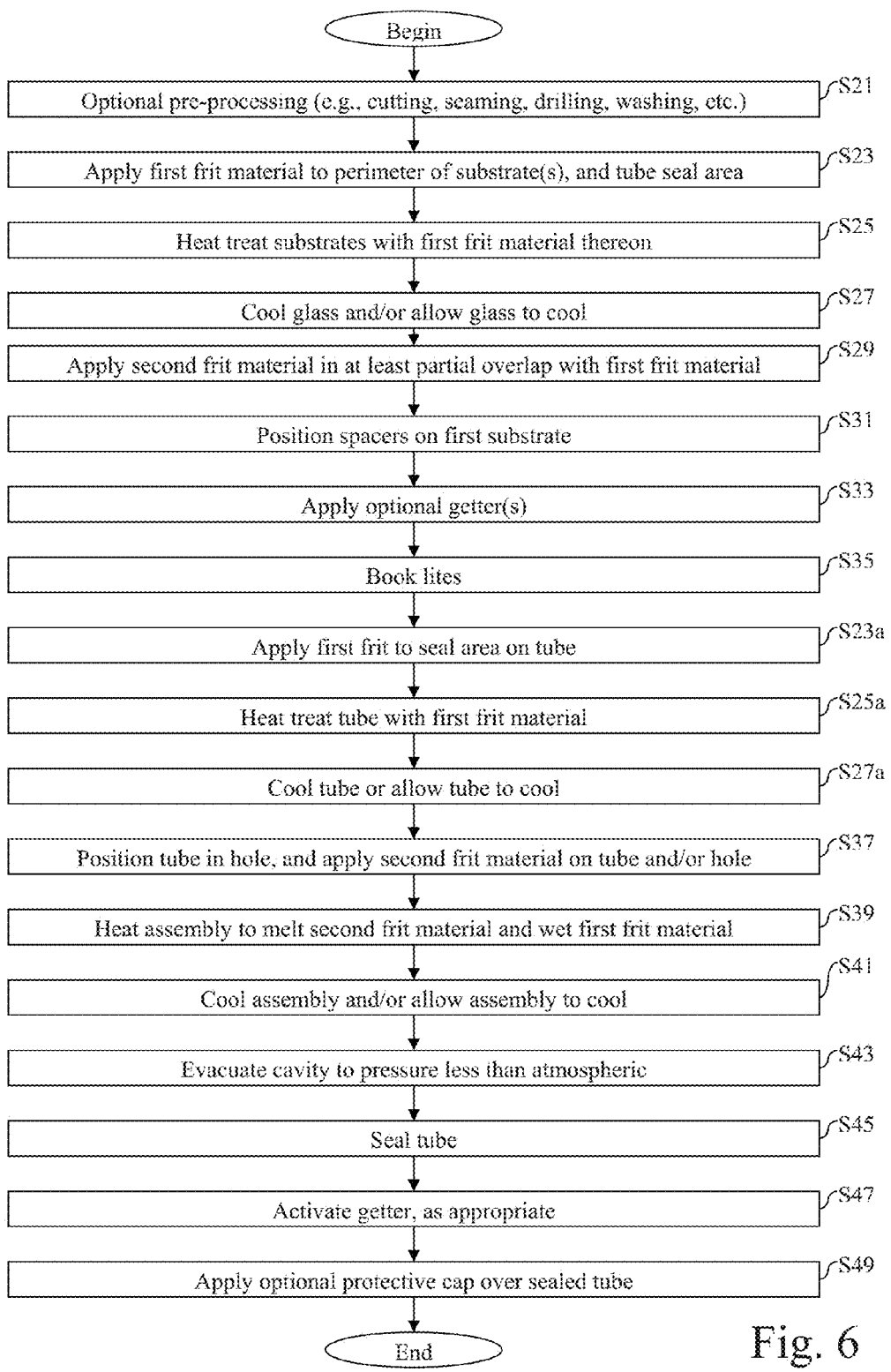
FIG. 6 is a flowchart illustrating a process that may be used in making the VIG shown in FIG. 5, in accordance with certain example embodiments.

FIG. 6 is a flowchart illustrating a process that may be used in making the VIG shown in FIG. 5, in accordance with certain example embodiments. It will be appreciated that the steps shown in FIG. 6 may be performed in any suitable order, including partial parallel orders (e.g., where steps S23a to S27a are concerned), and the specific example order shown should not be taken as limiting unless specifically claimed. Step S21 in FIG. 6 includes that optional pre-processing may take place. Optional pre-processing may include a number of different options such as, for example, cutting stock sheets to size, performing edge seaming, applying low emissivity and/or other coatings, edge deleting such coatings, drilling one or more pockets suitable for accommodating getter material(s), drilling the hole and optional pocket that accommodates the pump-out tube; applying frit to the hole whether the pump-out tube will be located, cleaning and/or washing operations (e.g., with DI water, plasma ashing, etc.), and/or the like.

In step S23, the first frit material is applied to the perimeter of the substrates and around the pump-out hole (e.g., in the second substrate). As indicated above, the first primer frit may be bismuth-based in certain example embodiments. In step S25, the substrates with the first frit material thereon is heat treated (e.g., heat strengthened and/or thermally tempered). This may fuse the primer material to the substrate in the desired perimeter, generally circumferential pattern. The heat treatment may be accomplished using any suitable furnace or the like. The substrates, once heat treated, may be cooled and/or allowed to cool, as indicated in step S27.

In step S23a, the first frit material is applied to the pump-out tube. As indicated above, the first primer frit may be bismuth-based in certain example embodiments. In step S25a, the pump-out tube with the first frit material thereon is heated so as to fuse the first frit onto the surface of the pump-out tube. The heat treatment may be accomplished using any suitable furnace or the like. The pump-out tube, once heat treated, may be cooled and/or allowed to cool, as indicated in step S27a.

It will be appreciated that further non heat treatable coatings optionally may be applied, post heat treatment. For example, although there are certain heat treatable low-E coatings, other low-E coatings are not heat treatable. Anti-reflective and/or other coatings also may be applied, e.g., using sputtering, wet chemical, and/or other techniques. Decorative and/or other patterns may be screen printed or otherwise formed thereon, as well.

In step S29, the second frit material is applied around the perimeter of the substrate, e.g., so that it at least partially overlaps the fired first frit. As indicated above, the second frit may be a VBZ-based frit in certain example embodiments.

Support pillars are placed on one of the substrates in step S31. Getter optionally is applied in the pocket(s), as a blanket coating on one or both substrates, and/or the like, in step S33.

The substrates are booked together in step S35, e.g., by bringing the second substrate down over the other substrate that is supporting the pillars, etc., such that the second frit material overlaps first frit areas at the perimeters of both substrates. In step S37 the pump-out tube with fused first frit material is placed in the pump-out hole in the second substrate, and second frit material is applied and/or pre-applied so as to at least partially overlap first frit areas at the hole in the second substrate, e.g., on the second substrate and/or on the tube. The assembly is heated in step S39, which helps to melt the second frit material and wet the first frit material. Preferably, the peak temperature reached by the glass is no more than 450 degrees C. (more preferably no more than 400 degrees C., and still more preferably no more than 360 degrees C.), and the time at that peak temperature preferably is less than 30 minutes, more preferably less than 15 minutes, and still more preferably less than 10 minutes (and sometimes only 3-7 minutes). Despite the low time and temperature, the material composition of the second frit is such that the second frit is able to melt and the first frit is wetted.

This sealing operation may be performed in connection with an oven that has selective heating capabilities, e.g., a source of heating energy that heats up the first and/or second frit faster than the float glass in the VIG. An example of selective heat energy is short-wave infrared (SWIR) light. The use of selective heating causes the first and second fit to heat up, and thus reach a higher peak temperature, faster than the glass.

Moreover, as indicated above, the first frit is selected to produce a mechanically strong and tough bond to the float glass (e.g., after typical heat treatment conditions, such as those associated with tempering, where the temperature of the glass reaches at least about 600 degrees C.). By contrast, the second frit is selected such that it melts and the first frit is wetted at a sufficiently low temperature (e.g., a temperature where the glass reaches no greater than 360 degrees C.) to preserve the temper in, and/or other heat strengthening characteristics of, the glass.

Referring once again to FIG. 6, the assembly may be cooled and/or allowed to cool, in step S41. Static or dynamic pressure optionally may be applied to the assembly, e.g., at least around the edges where the fit is located, to help ensure good contact during frit solidification, etc.

In step S43, the cavity is evacuated to a pressure less than atmospheric, e.g., by drawing air out through the pump-out tube. A target pressure may be at or near vacuum, and preferably is less than 0.1 Pa. It is noted that the cavity may be cleaned in connection with plasma-enhanced evacuation techniques and a static plasma grid or array, e.g., as set forth in U.S. Publication No. 2012/0304696, the entire contents of which are hereby incorporated by reference herein. Ozone cleaning techniques also may be used, e.g., as discussed in U.S. Publication No. 2013/0292000, the entire contents of which are hereby incorporated by reference herein.

The tube is sealed in step S45. This may be performed using the pump-out tube tip-off techniques described in connection with U.S. Publication Nos. 2013/0153550 and/or 2013/0153551, and/or U.S. application Ser. No. 13/628,653, filed Sep. 27, 2012, the entire contents of each of which are hereby incorporated by reference herein. The getter(s) may be activated in step S47, as appropriate. Getter materials and activation techniques are disclosed in, for example, U.S. Ser. Nos. 13/562,386; 13/562,408; 13/562,423, each filed on Jul. 31, 2012, the entire contents of each of which are hereby incorporated by reference herein.

The pump-out tube may have an optional protective cap applied over it, e.g., as shown in step S49. There are a variety of techniques that may be used to protect the pump-out tube and that may be used in connection with certain example embodiments. See, for example, U.S. Publication Nos. 2013/0074445, 2013/0302542, 2013/0305785, 2013/0306222, and 2013/0309425, the entire contents of each of which are hereby incorporated by reference herein.

An example composition of the first, primer frit is shown in the table that follows. It will be appreciated that other materials may be used together, or in place of, those shown below, and that the example weight percentages may be different in alternate embodiments. Although certain stoichiometries are shown for the example materials, these and/or other stoichiometries may be present in different example embodiments.

| Material | Preferred (Wt. %) | More Preferred (Wt. %) |
|---|---|---|
| Bismuth oxide ($Bi_2O_3$) | 55-95 | 70-80 |
| Zinc oxide (ZnO) | 2-20 | 2-7 |
| Silicon oxide ($SiO_2$) | 0-15 | 5-15 |
| Aluminum oxide ($Al_2O_3$) | 0-15 | 2-7 |
| Magnesium oxide (MgO) | 0-10 | 0-5 |
| Chromium (III) oxide ($Cr_2O_3$) | 0-10 | 0-5 |
| Iron (III) oxide ($Fe_2O_3$) | 0-10 | 0-5 |
| Cobalt oxide (CoO) | 0-10 | 0-5 |
| Sodium oxide (Na2O) | 0-10 | 0-5 |
| Manganese (II) oxide (MnO) | 0-10 | 0-5 |
| Barium oxide (BaO) | 0-10 | 0-5 |

An example composition of the second, sealing frit is shown in the table that follows. It will be appreciated that other materials may be used together, or in place of, those shown below, and that the example weight percentages may be different in alternate embodiments. Although certain stoichiometries are shown for the example materials, these and/or other stoichiometries may be present in different example embodiments.

| Material | Preferred (Wt. %) | More Preferred (Wt. %) | Example (Wt. %) |
|---|---|---|---|
| Vanadium (V) oxide ($V_2O_5$) | 40-70 | 45-67 | 52 |
| Barium oxide (BaO) | 5-30 | 7-25 | 23 |
| Zinc oxide (ZnO) | 2-20 | 4-17 | 10 |
| Tellurium oxide (TeO) | 0-15 | 0-13 | 3 |
| Molybdenum (IV) oxide ($MoO_3$) | 0-15 | 0-13 | 4 |
| Tantalum (V) oxide ($Ta_2O_5$) | 0-15 | 0-13 | 5 |
| Niobium (V) oxide ($Nb_2O_5$) | 0-15 | 0-13 | 3 |

The first frit may further comprise 2-7 wt. % $B_2O_3$ in certain example embodiments. The example frit compositions provided above list several materials with weight percent ranges that include 0 wt. %. In certain example embodiments, the frits may include small amounts of these and/or other materials such as, for example, down to about 0.25 wt. %, in at least some instances.

When a frit or sealing material is disposed onto a substrate, the coefficient of thermal expansion (CTE) of the sealing material may be different than that of the underlying substrate. This may create a CTE mismatch between the two materials. In such situations, as the temperature of the underlying substrate and the sealing material increases/decreases, the materials may respectively expand/shrink at different rates. This may cause structural problems in a product in which the sealing material is disposed (e.g., bound or adhered) against a substrate. For example, the sealing material may end up delaminating from the underlying substrate and causing the product to fail (e.g., as the VIG loses vacuum). As such failure is undesirable, a CTE filler may be added to the frit materials discussed above, e.g., to adjust its expansion rate to bring it closer to (or match) that of the underlying substrate.

In this regard, one or both of the first and second frits may include refractory fillers with low or negative coefficients of expansion in amounts appropriate to reduce the thermal expansion differences between the seal and the glass, e.g., as the primer fuses to the glass, as seal forms, in the final state, etc. This may help improve bonding, glass wetting, and/or other properties.

One traditional CTE filler material that may be used with certain example frit materials may be lead titanate. However, as discussed above, usage of lead as a CTE filler may be commercially impractical. Accordingly, non-lead based CTE filler material may be desirable in some cases. In certain example embodiments, CTE filler material may be mixed in the form of a powder (e.g., spherical silica—vacuum bubbles) or microspheres with a frit material to form a sealing material that is used on one or more substrate(s). Example glass bubbles include the K37, S60, S60 H, and IM30K type glass bubbles, commercially available from the 3M Company. As will be appreciated, the larger the bubble size the weaker mechanically the glass is (e.g., as shown in the crush strength), and in some cases increasing the ratio of glass bubble volume to frit material may reduce the amount of delaminating of the sealing material from a substrate.

In certain example embodiments, a CTE filler that is based on molybdenum (Mo) may be used. Molybdenum may have a linear ppm CTE of about 4.8. In certain example embodiments, shapes with a size of less than about 150 mesh or more even less than about 170 mesh may be used with certain example VBZ frit materials. Suitable materials may be obtained from, for example, H. C. Starck and/or Alfa Aesar (a Johnson Matthey Company). Certain example CTE fillers may have spheres in a size range between about 60 and 100 microns, more preferably between about 70 and 90 microns or, for example, about 80 microns in sphere diameter or major distance size. The CTE filler cordierite—2 $(MgO)$-2$(Al_2O_3)$-5$(SiO_2)$—also may be used in certain example embodiments.

With respect to CTE matchers in the frits of certain example embodiments, some instances may involve between 80% and 100% of the above identified sphere sizes, with the remainder of the particles and/or spheres being outside such a sphere size (e.g., spheres/particles that are greater than 100 microns or particles/spheres less than 60 microns). Additionally, not all of the "spheres" may be perfectly spherically shaped. For instance, some "spheres" may be partially or substantially spherically shaped (e.g., oblong in shape or erratically, spherically shaped). Thus, the particles that are used in certain CTE fillers may be "substantially" spherical. For example, more than half or 60% of the objects in a given CTE filler material may be "substantially" spherical, more preferably at least 80%, and even more preferably at least 95%. In certain instances, a percentage of spherically shaped elements in a CTE filler that are within a range of 60 to 100 microns may comprise at least 90% by volume of the CTE filler, more preferably at least 95%, and even more preferably at least 98%.

In certain instances, the surface chemistry of the spheres (or other shapes) may be modified to improved CTE matching properties and/or the mechanical strength of the spheres (e.g., to withstand the stress of a VIG article).

In certain example embodiments, the following materials may be used in conjunction with a frit material for CTE matching the frit to a glass substrate: $Cu_2P_2O_7 \cdot xH_2O$ (e.g., Copper Pyrophosphate Hydrate); $Mg_2P_2O_7$ (e.g., Magnesium Pyrophosphate); $SnP_2O_7$ (e.g., Tin Pyrophosphate-improved compatibility with at lower additions (e.g., 0.2-0.5 gm per 2.5 gm of frit material)); W (Tungsten powder—improved compatibility with frit materials at high addition levels (e.g., 1 to 1.5 gm per 2.5 gm of frit material)); Fe/Ni 65:35 wt % (e.g., Invar Alloy—improved compatibility with frit materials at higher addition levels (e.g., 0.6-0.8 gm per 2.5 gm of frit material)). Such materials (e.g., Invar) may be spherical in shape as the molybdenum material discussed above. Further, certain materials (e.g., Invar) may have decreased CTE—1.2 ppm—and may therefore lower the additional weight added to a frit to obtain CTE matching. In certain instances, ceramic fillers may be used that are in spherical form (or substantially spherical form). In certain example embodiments, quartz may be used. The quartz may be provided in the form of the spheres described herein. As the CTE of quartz is about 0.6, less material than other materials described herein may be needed in order to obtain a CTE match against a given substrate. One aspect of certain example embodiments relates to a filler that is inert and does not react with the molten frit glass during firing and/or other high-temperature processes. In certain example embodiments, Zirconium Tungstenate (e.g., Zirconium Tungsten Oxide or $ZrW_2Os$) powder may provide acceptable CTE matching for certain example frit materials with a soda lime float glass (e.g., with linear CTE for the glass being between about 7.0-11.0 ppm).

In certain example embodiments molybdenum spheres may be combined with glass bubbles (e.g., other particles). For example, 0.3-0.5 gm by weight of molybdenum spheres combined with 0.2-0.3 gm by weight of IM30K or between 0.15-0.35 by weight of $ZrW_2O_R$ and 0.2-0.3 gm of IM30K may be used according to certain example embodiments. In certain example embodiments, two or more of the discussed CTE fillers may be combined to form a combined CTE filler material.

Although certain example embodiments have been described as relating to spherical or generally spherical CTE fillers, other shapes may be used in place of or together with such shapes. For instance, football, eye-shaped, cylindrical, elongated, whisker-shaped, and/or other type particles may be used. Such shapes may be symmetrical and/or symmetrically curved in some example cases. In certain example embodiments, these shapes with major distances sizes of, for example, 60-100 microns, may be used. Moreover, it is to be understood that there may be some variation in a particular size and/or shape material. However, in the aggregate, the material distributions should generally have the specified sizes/shapes.

In certain example embodiments, the CTE of a frit material including an exemplary CTE filler may be within about 15% of the CTE of a substrate, more preferably within about 10%, even more preferably within about 5%, and even more preferably within about 3%. For instance, it is known that glass has a CTE of 8.6 ppm, e.g., over a temperature range of about 25-300 degrees C. It would be desirable to provide a CTE filler material that is less than or equal to this value. For instance, a CTE of 8.0 ppm over the same or similar range would be desirable. Doing so will keep the glass in a state of compression, which is desirable.

Frit materials may sometimes include binder agents that are used to, for example, facilitate binding the various materials that make up the frit. However, in certain instances the materials used in a frit may have a melting temperature that is less than a burn out point for a binder that is used in the frit. In such situations, the incomplete burn off of a binder may result in a porous frit seal, reduced frit to glass bonding due to, for example, carbon contamination in the frit, or other characteristics that may be undesirable for frit based seals. Thus, certain example embodiments may include frits with desirable binder agents that burn off with the heat treatment and subsequent firing operations. Example binders include binders based on: a methyl cellulose polymer binder (e.g., a 400 cps molecular weight polymer in DI water, which the assignee has found to have a burnout temperature of around 320-380 degrees C.); a polyethylene carbonate binder, for example, $[CH_2CH_2OCO_2]n$ or $C_3H_4O_3$ (e.g., QPAC® 25 commercially available from Empower Materials Inc.), a polypropylene carbonate binder, for example, $[CH_3CHCH_2OCO_2]n$ or $C_4H_6O_3$ (e.g., QPAC® 40 commercially available from Empower Materials Inc., which the assignee has found to have a burnout temperature of around 250-275 degrees C.); and/or the like.

One or both of the first and second substrates may be thermally tempered in certain example embodiments and, in such cases, the heating operation(s) may be performed in connection with a peak temperature (or peak temperatures) sufficiently low so that the tempered first and second substrates retain at least about 50% of their original temper strength after the heating is complete (e.g., once the VIG unit is made), more preferably at least about 60% of their original temper strength after the heating is complete, still more preferably at least about 70% of their original temper strength after the heating is complete, still more preferably at least about 75% of their original temper strength after the heating is complete, and sometimes 80-90% or more of their original temper strength after the heating is complete.

The superior seal of the tempered VIG produced by techniques set forth herein was identified while attempting to pry sealed VIGs apart. The lites could not be separated without breaking one or both, and where the fracture was parallel to the seal, it was found to occur in the glass and not in the seal or the seal to glass interface. In other words, both the seal bond to the glass and the cohesive strength of the seal exceeded the strength of the glass in such samples. In this experiment, annealed glass was used, but the heating process adjusted to temper preserving conditions. Repeat experiments using tempered glass produced tight breakage patterns, verifying the preservation of the tempered condition, etc.

In certain example embodiments, one or both frits may be "lead free." For instance, in certain example embodiments, no lead will be used in making the base frits, and only trace amounts might be possible (e.g., from raw materials and/or tools used). The example materials listed above tend to be available without any detectable amount of lead as contaminates. It thus will be appreciated that certain "lead free" compositions may have only very small amounts of lead therein, e.g., less than 1-3 ppm lead.

Certain example embodiments may use the example frits disclosed in U.S. application Ser. No. 13/480,987, filed on May 25, 2012 in place of, or together with, some of the example flits disclosed herein.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

It is noted that the VIG units may be used in a number of different applications including, for example, residential and/or commercial window applications, etc. One or both substrates of the VIG unit may be heat treated (e.g., heat strengthened and/or thermally tempered) in different example embodiments.

Although certain example embodiments have been described in connection with VIG units, it will be appreciated that the example techniques described herein may include one or more substrates formed from a material other than glass. In other words, because the example techniques herein are able to form hermetic seals at low processing times and temperatures, it becomes possible to use alternative substrate materials such as, for example, plastics, Plexiglas, etc. As alluded to above, such materials may be used as one or both substrates in a vacuum insulating panel (VIP) unit or the like. Any or all of the features, aspects, techniques, configurations, etc., as described above can be used in such VIP units. Moreover, it will be appreciated that the example VIG and VIP units described herein may be laminated to another substrate in certain example embodiments.

The terms "peripheral" and "edge" used herein in connection with seals, for example, do not mean that the seal(s) and/or other element(s) is/are located at the absolute periphery or edge of the unit, but instead mean that the seal(s) and/or other element(s) is/are at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making a vacuum insulating glass window unit comprising first and second glass substrates is provided. Each said substrate has first and second major surfaces. A first lead-free frit material is applied around perimeter edges of the first major surfaces of the first and second substrates. The first and second substrates with the first frit material thereon are heat treated, the first and second substrates reaching a first peak temperature. Following said heat treatment, a second lead-free frit material is applied on the first and/or second substrate(s) such that, for each substrate on which the second frit material is applied, the second frit material at least partially overlaps the first frit material on the respective substrate around peripheral edges thereof, the first and second frit materials having different compositions. A plurality of spacers is positioned on the first surface of the first substrate. The first and second substrates are brought together such that the first major surfaces of the first and second substrates face one another, and such that a cavity is defined therebetween, in making a VIG unit subassembly. The subassembly is heated in order to melt the second frit material and wet the first frit material, the heating being performed such that the first and second substrates reach a second peak temperature that is no higher than 400 degrees C. and that is at least 150 degrees C. lower than the first peak temperature. Following said heating of the subassembly, the subassembly is cooled and/or allowed to cool, in forming an edge seal between the first and second substrates. The cavity is evacuated to a pressure less than atmospheric via a pump-out port. The pump-out port is sealed in making the VIG unit.

In addition to the features of the previous paragraph, in certain example embodiments, the second peak temperature may be held for no more than 15 minutes.

In addition to the features of either of the two previous paragraphs, in certain example embodiments, the second peak temperature may be no more than 360 degrees C. and may be held for no more than 10 minutes.

In addition to the features of any of the three previous paragraphs, in certain example embodiments, pressure may be applied as said subassembly is cooled and/or allowed to cool, in forming the edge seal.

In addition to the features of any of the four previous paragraphs, in certain example embodiments, the pump-out port may be a pump-out tube provided in a hole drilled in one of the first and second substrates.

In addition to the features of the previous paragraph, in certain example embodiments, the first frit material may be applied to interior surfaces of the hole prior and/or to the pump-out tube prior to said heat treating.

In addition to the features of the previous paragraph, in certain example embodiments, the second frit material may be applied as an outermost frit material around the pump-out tube prior to said heating of the subassembly.

In addition to the features of the previous paragraph, in certain example embodiments, the pump-out tube may be inserted with the second frit material applied thereon in the hole.

In addition to the features of any of the eight previous paragraphs, in certain example embodiments, the heat treating may comprise thermal tempering.

In addition to the features of any of the nine previous paragraphs, in certain example embodiments, the first frit material may comprise at least 65% bismuth oxide, by weight.

In addition to the features of the previous paragraph, in certain example embodiments, the first frit material may further comprise at least 2% zinc oxide, by weight.

In addition to the features of any of the 11 previous paragraphs, in certain example embodiments, the first frit material may comprise 70-80 wt. % bismuth oxide, 2-7 wt. % zinc oxide, 5-15 wt. % silicon oxide, 2-7 wt. % aluminum oxide, 0-5% magnesium oxide, 0-5% chromium oxide, 0-5% iron oxide, 0-5% cobalt oxide, 0-5% sodium oxide, 0-5% manganese oxide, and 0-5% barium oxide.

In addition to the features of the previous paragraph, in certain example embodiments, the first frit material may comprise CTE filler material, the CTE filler material lowering the CTE of the first frit material when introduced therein.

In addition to the features of any of the 13 previous paragraphs, in certain example embodiments, the second frit material may comprise vanadium oxide, barium oxide, and zinc oxide, in amounts that total at least 65% by weight.

In addition to the features of the previous paragraph, in certain example embodiments, the second frit material may comprise 45-67 wt. % vanadium oxide, 7-25 wt. % barium oxide, and 4-17 wt. % zinc oxide.

In addition to the features of the previous paragraph, in certain example embodiments, the second frit material may further comprise 0-13 wt. % tellurium oxide, 0-13 wt. % molybdenum oxide, 0-13 wt. % tantalum oxide, and 0-13 wt. % niobium oxide, and at least one of the tellurium oxide, molybdenum oxide, tantalum oxide, and niobium oxide may be provided at at least 0.25 wt. %.

In addition to the features of the previous paragraph, in certain example embodiments, the second frit material may further comprise CTE filler material, the CTE filler material lowering the CTE of the second frit material when introduced therein.

In addition to the features of any of the six previous paragraphs, in certain example embodiments, the second frit material may comprise vanadium oxide, barium oxide, and zinc oxide, in amounts that total at least 65% by weight.

In addition to the features of the previous paragraph, in certain example embodiments, the second frit material may comprise 45-67 wt. % vanadium oxide, 7-25 wt. % barium oxide, and 4-17 wt. % zinc oxide.

In addition to the features of the previous paragraph, in certain example embodiments, the first and/or second frit material(s) may comprise CTE filler material, the CTE filler material lowering the CTE thereof when introduced therein.

In addition to the features of any of the 20 previous paragraphs, in certain example embodiments, the heating of the subassembly preferentially heats the first and/or second frit materials.

In addition to the features of the previous paragraph, in certain example embodiments, preferential heating may be accomplished using short-wave infrared radiation.

In addition to the features of any of the 22 previous paragraphs, in certain example embodiments, the first and second substrates may be thermally tempered, and the heating of the subassembly may be performed in connection with a second peak temperature sufficiently low so that the tempered first and second substrates retain at least about 70% of their original temper strength after the heating of the subassembly is complete.

In addition to the features of any of the 23 previous paragraphs, in certain example embodiments, the first and second substrates may be thermally tempered, and the heating of the subassembly may be performed in connection with a second peak temperature sufficiently low so that the tempered first and second substrates retain at least about 90% of their original temper strength after the heating of the subassembly is complete.

In certain example embodiments, a method of making a vacuum insulating glass (VIG) window unit is provided. First and second articles are each a glass substrate having first and second major surfaces and having a first lead-free frit material fused thereon around peripheral edges of the first major surface as a result of having been heat treated with the respective substrate. A second lead-free frit material is applied on the first and/or second substrate(s) such that, for each substrate on which the second frit material is applied, the second frit material at least partially overlaps the first frit material on the respective substrate around peripheral edges thereof, the first and second frit materials having different compositions. A plurality of spacers is positioned on the first surface of the first substrate. The first and second substrates are brought together such that the first major surfaces of the first and second substrates face one another, and such that a cavity is defined therebetween, in making a VIG unit subassembly. The subassembly is heated in order to melt the second frit material and wet the first frit material, the heating being performed such that the first and second substrates reach a second peak temperature that is no higher than 400 degrees C. and that is at least 150 degrees C. lower than the first peak temperature. Following said heating of the subassembly, the subassembly is cooled and/or allowed to cool, in forming an edge seal between the first and second substrates. The cavity is evacuated to a pressure less than atmospheric via a pump-out port. The pump-out port is sealed in making the VIG unit.

In certain example embodiments, a VIG window unit is provided. There are first and second substantially parallel, spaced apart glass substrates. At least one of the first and second substrates is heat treated. A plurality of spacers is disposed between the first and second substrates. An edge seal is provided around the periphery of the first and/or second substrates, with the first and second substrates, together with the edge seal, defining a cavity therebetween, the cavity being evacuated to a pressure less than atmospheric. The edge seal is an hermetic seal formed by heating via a low temperature process for a short duration a second lead-free frit material that is sandwiched between bands of first frit materials fused with the first and second substrates during a high temperature process, the low temperature process being performed in connection with a second peak temperature of no more than 400 degrees C. and a time of no more than 15 minutes at the second peak temperature, and the high temperature being performed at a first peak temperature that is at least 150 degrees C. higher than the second peak temperature.

In addition to the features of the previous paragraph, in certain example embodiments, the high temperature process may be the heat treatment process.

In addition to the features of either of the two previous paragraphs, in certain example embodiments, at least one of the first and second substrates may be thermally tempered.

In addition to the features of any of the three previous paragraphs, in certain example embodiments, a pump-out tube may be provided in a hole drilled in one of the first and second substrates, the pump-out tube being secured in the hole using a seal formed using the same materials as those used to make the edge seal.

In addition to the features of any of the four previous paragraphs, in certain example embodiments, the first frit material may comprise at least 65% bismuth oxide, by weight.

In addition to the features of the previous paragraph, in certain example embodiments, the first flit material may comprise 70-80 wt. % bismuth oxide, 2-7 wt. % zinc oxide, 5-15 wt. % silicon oxide, 2-7 wt. % aluminum oxide.

In addition to the features of any of the six previous paragraphs, in certain example embodiments, the second frit material may comprise vanadium oxide, barium oxide, and zinc oxide, in amounts that total at least 65% by weight.

In addition to the features of the previous paragraph, in certain example embodiments, the second frit material may comprise 45-67 wt. % vanadium oxide, 7-25 wt. % barium oxide, and 4-17 wt. % zinc oxide.

In addition to the features of the previous paragraph, in certain example embodiments, the second frit material may further comprise 0-13 wt. % tellurium oxide, 0-13 wt. % molybdenum oxide, 0-13 wt. % tantalum oxide, and 0-13 wt. % niobium oxide, and at least one of the tellurium oxide, molybdenum oxide, tantalum oxide, and niobium oxide may be provided at at least 0.25 wt. %.

In addition to the features of any of the four previous paragraphs, in certain example embodiments, the second frit material may comprise 45-67 wt. % vanadium oxide, 7-25 wt. % barium oxide, and 4-17 wt. % zinc oxide.

In addition to the features of any of the five previous paragraphs, in certain example embodiments, the first and/or second frit material(s) may comprise coefficient of thermal expansion (CTE) filler material, the CTE filler material lowering the CTE thereof when introduced therein.

In addition to the features of any of the 11 previous paragraphs, in certain example embodiments, the first and second substrates may be thermally tempered, and the second peak temperature may be sufficiently low so that the tempered first and second substrates retain at least about 70% of their original temper strength when the VIG unit is fully assembled.

In certain example embodiments, a method of making a VIG window unit comprising first and second glass substrates is provided. Each said substrate has first and second major surfaces. A first lead-free frit material is applied around perimeter edges of the first major surfaces of the first and second substrates. The first and second substrates with the first frit material thereon are heated, the first and second substrates reaching a first peak temperature. Following said heat treatment, a second lead-free frit material is applied on the first and/or second substrate(s) such that, for each substrate on which the second frit material is applied, the second frit material at least partially overlaps the first frit material on the respective substrate around peripheral edges thereof, the first and second frit materials having different compositions. A plurality of spacers is positioned on the first surface of the first substrate. The first and second substrates are brought together such that the first major surfaces of the first and second substrates face one another, and such that a cavity is defined therebetween, in making a VIG unit subassembly. The subassembly is heated in order to melt the second frit material and wet the first frit material, the heating being performed such that the first and second substrates reach a second peak temperature that is no higher than 400 degrees C. and that is at least 150 degrees C. lower than the first peak temperature. Following said heating of the subassembly, the subassembly is cooled and/or allowed to cool, in forming an edge seal between the first and second substrates. The cavity is evacuated to a pressure less than atmospheric via a pump-out port. The pump-out port is sealed in making the VIG unit. At least one of the first and second substrates is thermally tempered. The second peak temperature is sufficiently low so that the tempered substrate(s) retain(s) at least about 90% of the original temper strength after the heating of the subassembly. In certain example embodiments, a method of making a VIG window unit comprising first and second glass substrates is provided. Each said substrate has first and second major surfaces. First lead-free frit material is applied around perimeter edges of the first major surfaces of the first and second substrates. First lead-free frit material is applied at a pump-out port in the second substrate. The first and second substrates with the first frit material thereon are heated, the first and second substrates reaching a first peak temperature. Following said heat treatment, second lead-free frit material is applied on the first and/or second substrate(s) such that, for each substrate on which the second frit material is applied, the second frit material at least partially overlaps the first frit material on the respective substrate around peripheral edges thereof, the first and second frit materials having different compositions. A plurality of spacers are positioned on the first surface of the first substrate. The first and second substrates are brought together such that the first major surfaces of the first and second substrates face one another, and such that a cavity is defined therebetween, in making a VIG unit subassembly. A pump-out tube is inserted into the pump-out port in the second substrate, the tube having been previously heated with the first frit material applied to its surface to fire the first frit material into its surface, and having second frit material applied thereto so as to at least partially overlap the first frit areas at the pump-out port and on the tube. The subassembly is heated in order to melt the second frit material and wet the first frit material, the heating being performed such that the first and second substrates reach a second peak temperature that is no higher than 400 degrees C. and that is at least 150 degrees C. lower than the first peak temperature. Following said heating of the subassembly, the subassembly is cooled and/or allowed to cool, in forming an edge seal between the first and second substrates and a seal between the tube and the second substrate. The cavity is evacuated to a pressure less than atmospheric via a pump-out tube. The pump-out tube is sealed in making the VIG unit. At least one of the first and second substrates is thermally tempered. The second peak temperature is sufficiently low so that the tempered substrate(s) retain(s) at least about 70% of the original temper strength after the heating of the subassembly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum insulating glass (VIG) unit, comprising:
    first and second substantially parallel, spaced apart glass substrates;
    a plurality of spacers disposed between the first and second substrates;
    an edge seal provided around the periphery of the first and/or second substrates, the first and second substrates, together with the edge seal, defining a cavity therebetween, the cavity being at a pressure less than atmospheric pressure; and
    wherein the edge seal is an hermetic seal comprising both a first frit material that is a bismuth oxide based frit material, and a second frit material that is a vanadium oxide based frit material, bismuth oxide and vanadium oxide being the largest components of the first and second frit materials, respectively.

2. The VIG unit of claim 1, wherein at least one of the first and second glass substrates is thermally tempered.

3. The VIG unit of claim 1, wherein the first frit material comprises at least 65% bismuth oxide, by weight.

4. The VIG unit of claim 3, wherein the first frit material comprises 70-80 wt. % bismuth oxide, 2-7 wt. % zinc oxide, 5-15 wt. % silicon oxide, 2-7 wt. % aluminum oxide.

5. The VIG unit of claim 1, wherein the second frit material comprises vanadium oxide, barium oxide, and zinc oxide, in amounts that total at least 65% by weight.

6. The VIG unit of claim 1, wherein the second frit material comprises 45-67 wt. % vanadium oxide, 7-25 wt. % barium oxide, and 4-17 wt. % zinc oxide.

* * * * *